United States Patent
Burns

(10) Patent No.: US 8,793,181 B2
(45) Date of Patent: *Jul. 29, 2014

(54) METHOD, APPARATUS AND INTERFACE FOR TRADING MULTIPLE TRADEABLE OBJECTS

(71) Applicant: Trading Technologies International, Inc., Chicago, IL (US)

(72) Inventor: Michael J. Burns, Chicago, IL (US)

(73) Assignee: Trading Technologies International, Inc., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/659,050

(22) Filed: Oct. 24, 2012

(65) Prior Publication Data

US 2013/0054442 A1 Feb. 28, 2013

Related U.S. Application Data

(63) Continuation of application No. 13/190,954, filed on Jul. 26, 2011, now Pat. No. 8,321,331, which is a continuation of application No. 12/580,905, filed on Oct. 16, 2009, now Pat. No. 8,015,100, which is a continuation of application No. 11/418,475, filed on May 3, 2006, now Pat. No. 7,627,519, which is a continuation of application No. 10/293,585, filed on Nov. 13, 2002, now Pat. No. 7,418,422.

(51) Int. Cl.
*G06Q 40/00* (2012.01)
*G06Q 40/04* (2012.01)

(52) U.S. Cl.
CPC ............................. *G06Q 40/04* (2013.01)
USPC .......................................................... 705/37

(58) Field of Classification Search
CPC ..................................................... G06Q 40/04
USPC .............................................................. 705/37
See application file for complete search history.

(56) References Cited

U.S. PATENT DOCUMENTS 4,412,287 A 10/1983 Braddock, III
4,674,044 A 6/1987 Kalmus et al.
(Continued)

FOREIGN PATENT DOCUMENTS

EP 1067471 A1 1/2001
WO 91/14231 A1 9/1991
(Continued)

OTHER PUBLICATIONS

U.S. Appl. No. 13/659,055, filed Oct. 24, 2012, Michael J. Burns.
(Continued)

*Primary Examiner* — Eric T Wong
(74) *Attorney, Agent, or Firm* — McDonnell Boehnen Hulbert & Berghoff LLP

(57) ABSTRACT

An interface for trading multiple tradeable objects includes a price axis or scale. A first indication of quantities represented in a market for a first tradeable object is displayed in association with the price axis or scale. A second indication of quantities represented in the market for a second tradeable object is displayed in association with the price axis or scale. The first tradeable object may be different than the second tradeable object. Alternatively, the first tradeable object and the second tradeable object may be the same, but the indications of quantity may be provided from different sources, such as different exchanges.

24 Claims, 5 Drawing Sheets

(56) References Cited

U.S. PATENT DOCUMENTS

| | | | |
|---|---|---|---|
| 4,750,135 A | 6/1988 | Boilen | |
| 4,903,201 A | 2/1990 | Wagner | |
| 5,038,284 A | 8/1991 | Kramer | |
| 5,077,665 A | 12/1991 | Silverman et al. | |
| 5,101,353 A | 3/1992 | Lupien et al. | |
| 5,136,501 A | 8/1992 | Silverman et al. | |
| 5,270,922 A | 12/1993 | Higgins | |
| 5,297,031 A | 3/1994 | Gutterman et al. | |
| 5,297,032 A | 3/1994 | Trojan et al. | |
| 5,689,651 A | 11/1997 | Lozman | |
| 5,774,877 A | 6/1998 | Patterson, Jr. et al. | |
| 5,793,301 A | 8/1998 | Patterson, Jr. et al. | |
| 5,797,002 A | 8/1998 | Patterson, Jr. et al. | |
| 5,809,483 A | 9/1998 | Broka et al. | |
| 5,845,266 A | 12/1998 | Lupien et al. | |
| 5,915,245 A | 6/1999 | Patterson, Jr. et al. | |
| 5,924,082 A | 7/1999 | Silverman et al. | |
| 5,924,083 A | 7/1999 | Silverman et al. | |
| 5,946,667 A | 8/1999 | Tull, Jr. et al. | |
| 5,963,923 A | 10/1999 | Garber | |
| 6,012,046 A | 1/2000 | Lupien et al. | |
| 6,014,643 A | 1/2000 | Minton | |
| 6,035,287 A | 3/2000 | Stallaert et al. | |
| 6,098,051 A | 8/2000 | Lupien et al. | |
| 6,131,087 A | 10/2000 | Luke et al. | |
| 6,134,535 A | 10/2000 | Belzberg | |
| 6,195,647 B1 | 2/2001 | Martyn et al. | |
| 6,272,474 B1 | 8/2001 | Garcia | |
| 6,278,982 B1 | 8/2001 | Korhammer et al. | |
| 6,282,521 B1 | 8/2001 | Howorka | |
| 6,408,282 B1 | 6/2002 | Buist | |
| 6,697,099 B2 | 2/2004 | Smith et al. | |
| 6,766,304 B2 | 7/2004 | Kemp, II et al. | |
| 6,772,132 B1 | 8/2004 | Kemp, II et al. | |
| 6,856,967 B1 | 2/2005 | Woolston et al. | |
| 6,938,011 B1 | 8/2005 | Kemp, II et al. | |
| 7,127,424 B2 | 10/2006 | Kemp, II et al. | |
| 7,181,424 B1 | 2/2007 | Ketchum et al. | |
| 7,243,083 B2 | 7/2007 | Burns et al. | |
| 7,389,268 B1 | 6/2008 | Kemp, II et al. | |
| 7,418,422 B2 | 8/2008 | Burns | |
| 7,512,561 B2 | 3/2009 | Burns | |
| 7,523,064 B2 | 4/2009 | Burns et al. | |
| 7,571,134 B1 | 8/2009 | Burns et al. | |
| 7,577,602 B2 | 8/2009 | Singer | |
| 7,627,519 B2 | 12/2009 | Burns | |
| 7,765,134 B1 | 7/2010 | Pazner | |
| 7,774,267 B2 | 8/2010 | Burns et al. | |
| 8,015,100 B2 | 9/2011 | Burns | |
| 8,321,331 B2 | 11/2012 | Burns | |
| 8,332,304 B2 | 12/2012 | Burns et al. | |
| 2001/0042040 A1 | 11/2001 | Keith | |
| 2002/0023038 A1 | 2/2002 | Fritsch et al. | |
| 2002/0035534 A1 | 3/2002 | Buist et al. | |
| 2002/0055899 A1 | 5/2002 | Williams | |
| 2002/0059129 A1 | 5/2002 | Kemp et al. | |
| 2002/0073017 A1 | 6/2002 | Robertson | |
| 2002/0099644 A1 | 7/2002 | Kemp, II et al. | |
| 2002/0103741 A1 | 8/2002 | Boies et al. | |
| 2002/0138401 A1 | 9/2002 | Allen et al. | |
| 2002/0184237 A1 | 12/2002 | McFeely | |
| 2002/0194114 A1 | 12/2002 | Erdmier | |
| 2003/0004852 A1* | 1/2003 | Burns | 705/37 |
| 2003/0004853 A1 | 1/2003 | Ram et al. | |
| 2003/0009411 A1* | 1/2003 | Ram et al. | 705/37 |
| 2003/0023542 A1 | 1/2003 | Kemp, II et al. | |
| 2004/0093300 A1 | 5/2004 | Burns | |
| 2005/0149428 A1 | 7/2005 | Gooch et al. | |
| 2006/0015436 A1 | 1/2006 | Burns et al. | |
| 2006/0259411 A1 | 11/2006 | Burns | |
| 2006/0265322 A1 | 11/2006 | Burns | |
| 2009/0043664 A1 | 2/2009 | Lutnick et al. | |
| 2009/0119201 A1 | 5/2009 | Burns et al. | |
| 2009/0240617 A1 | 9/2009 | Burns et al. | |
| 2010/0036766 A1 | 2/2010 | Burns | |
| 2010/0268637 A1 | 10/2010 | Burns | |
| 2011/0282777 A1 | 11/2011 | Burns et al. | |
| 2013/0054443 A1 | 2/2013 | Burns et al. | |

FOREIGN PATENT DOCUMENTS

| | | |
|---|---|---|
| WO | 95/06918 A2 | 3/1995 |
| WO | 95/06918 A3 | 4/1995 |
| WO | 95/26005 A1 | 9/1995 |
| WO | 98/49639 A1 | 11/1998 |
| WO | 99/19821 A1 | 4/1999 |
| WO | 99/30259 A1 | 6/1999 |
| WO | 99/53424 A1 | 10/1999 |
| WO | 00/52619 A1 | 9/2000 |
| WO | 00/62187 A2 | 10/2000 |
| WO | 00/65510 A1 | 11/2000 |
| WO | 01/08057 A1 | 2/2001 |
| WO | 01/16830 A1 | 3/2001 |
| WO | 01/16852 A2 | 3/2001 |
| WO | 01/22315 A2 | 3/2001 |
| WO | 01/65403 A2 | 9/2001 |
| WO | WO-01/75733 A1 | 10/2001 |
| WO | 01/88808 A1 | 11/2001 |
| WO | 00/62187 A3 | 12/2001 |
| WO | 01/22315 A3 | 1/2002 |
| WO | 02/59815 A1 | 1/2002 |
| WO | 02/15461 A2 | 2/2002 |
| WO | 02/29686 A1 | 4/2002 |
| WO | 01/16852 A8 | 6/2002 |
| WO | 02/48945 A1 | 6/2002 |
| WO | 02/069226 A2 | 9/2002 |
| WO | 02/079940 A2 | 10/2002 |
| WO | 02/093325 A2 | 11/2002 |
| WO | 02/099599 A2 | 12/2002 |
| WO | 02/103601 A1 | 12/2002 |
| WO | 03/090032 A2 | 10/2003 |
| WO | 03/090032 A3 | 12/2003 |

OTHER PUBLICATIONS

"APT: A trading system for the future," The London International Financial Futures Exchange (LIFFE), 1990, 11 pages.

"AURORA: The most technologically advanced trading system available today," Chicago Board of Trade, 1989, 11 pages.

"Expanding Futures and Options Trading Around the World, Around the Clock," GLOBEX, 1989, 48 pages.

"One Click Trading Options," Trading Technologies, Inc., 1998, one page.

"Sydney Futures Exchange Announces Plans to Join GLOBEX," GLOBEX Report: An Update on the CME global electronic exchange, vol. II, No. 2, Feb. 10, 1989, 4 pages.

Cavaletti, C., "Order Routing," *Futures* Magazine, Feb. 1997, pp. 68-70.

Declaration of Brendan Bradley in Case No. 04 C 5312, Nov. 18, 2004, 27 pages.

Grummer, et al., "Preliminary Feasibility Study," Bermudex Ltd., Nov. 1980, 100 pages.

Hansell, S., "The Computer that Ate Chicago," Institutional Investor, Feb. 1989, 5 pages.

International Search Report of International Application No. PCT/US2003/036042, dated Dec. 6, 2004 (mailed Dec. 30, 2006).

International Search Report of International Application No. PCT/US2005/033991, dated Jan. 4, 2007 (mailed Feb. 6, 2007).

International Preliminary Report on Patentability of International Application No. PCT/US2005/033991, dated Apr. 3, 2007 (mailed Apr. 12, 2007).

Kharouf, J. and Cavaletti, C. "A Trading Room with a View," *Futures*, vol. 27, Nov. 1998, pp. 66-71.

Lerman, D., "Exchange Traded Funds and E-Mini Stock Index Futures", John Willey and Sons, 2001, pp. 166-168 and 286-288, Accessed via Google Books at http://books.google.com.

Market Watch Trading Screen, n.d., 1 page.

Memorandum Opinion and Order of Judge James B. Moran in Case No. 04 C 5312, Feb. 9, 2005, 22 pages.

New York Mercantile Exchange (NYMEX) Access Documents, Feb. 28, 1992, 413 pages.

(56) References Cited

OTHER PUBLICATIONS

Peake, et al., Appendix C of Preliminary Feasibility Study, "The ABCs of Trading on a National Market System," Bermudex Ltd., Sep. 1997, 16 pages.

Peake, J.W., Appendix E of Preliminary Feasibility Study, "The Last Fifteen Meters," Bermudex Ltd., Jun. 15, 1997, 18 pages.

The Computer Assisted Trading System (CATS) Traders' Manual, Toronto Stock Exchange, Sep. 30, 1977, 142 pages.

Trading Screen, INTEX of Bermuda, 1984, one page.

Trading Screen, MEFF Exchange, 1990, one page.

Trading Screen, SWX Exchange, 1990, two pages.

Trading Screen, TIFFE Exchange, circa 1989-1990, one page.

USPTO Presentation, NASDAQ, Nov. 8, 2001, 15 pages.

Weber, B.W., "Information Technology in the Major International Financial Markets," Stem School of Business, New York University, Apr. 7, 1993, pp. 1-43.

X_Trader Product HTML Page [online], Trading Technologies International, Inc., Jun. 9, 2000. [Retrieved on Mar. 22, 2001] from the Internet: www.tradingtechnologies.com/products/xtrade_full.html.

U.S. Appl. No. 14/148,984, filed Jan. 7, 2014, Michael J. Burns.

* cited by examiner

| CBT CNTRLS | CBT Working | OFFSET | | TOTAL POS - 127 | OFFSET | | BT Working | BT CNTRLS |
|---|---|---|---|---|---|---|---|---|
| | | BT | CBT | | CBT | CBT | | |
| | | | | 10227 | 288 | | | |
| | | | | 10226 | 278 | | | |
| | | | | 10225 | 468 | 129 | | |
| 100 | | | | 10224 | 631 | | | 227 |
| | | | | 10223 | | 917 | | |
| | | | | 10222 | 791 | | | |
| | | | | 10221 | 568 | 514 | | |
| 1 | 2 | | | 10220 | 382 | | | 1 | 2 |
| 5 | 10 | | | 10219 | 837 | 217 | | 5 | 10 |
| 25 | 75 | | | 10218 | 434 | 481 | | 25 | 75 |
| | | | | 10217 | 243 | 12 | | |
| | | 249 | 645 | 10216 | | | | |
| | | 145 | 320 | 10215 | | | | |
| | | | 651 | 10214 | | | | |
| | | 412 | 342 | 10213 | | | | |
| | | 270 | | 10212 | | | | |
| | | | 542 | 10211 | | | | |
| | | 691 | 187 | 10210 | | | | |
| | | | 234 | 10209 | | | | |
| | | 364 | 1024 | 10208 | | | | |

FIG. 2

| CBT CNTRLS | CBT Working | CBT Offset CBT/BT | Total POS -127 | BT Offset 0 CBT/BT | BT Working | BT CNTRLS |
|---|---|---|---|---|---|---|
| | | | 10227 | 288 | | |
| | | | 10226 | 278 | | |
| | | | 10225 | 597 | | |
| 100 | | | 10224 | 631 | | 227 |
| | | | 10223 | 917 | | |
| | | | 10222 | 791 | | |
| | | | 10221 | 1082 | | |
| 1 \| 2 | | | 10220 | 382 | | 1 \| 2 |
| 5 \| 10 | | | 10219 | 1054 | | 5 \| 10 |
| 25 \| 75 | | | 10218 | 915 | | 25 \| 75 |
| | | | 10217 | 255 | | |
| | | 894 | 10216 | | | |
| | | 465 | 10215 | | | |
| | | 651 | 10214 | | | |
| | | 754 | 10213 | | | |
| | | 270 | 10212 | | | |
| | | 542 | 10211 | | | |
| | | 878 | 10210 | | | |
| | | 234 | 10209 | | | |
| | | 1388 | 10208 | | | |

FIG. 3

METHOD, APPARATUS AND INTERFACE FOR TRADING MULTIPLE TRADEABLE OBJECTS

CROSS REFERENCE TO RELATED APPLICATIONS

The present application is a continuation of U.S. patent application Ser. No. 13/190,954 filed Jul. 26, 2011, now U.S. Pat. No. 8,321,331, entitled "Method, Apparatus and Interface for Trading Multiple Tradeable Objects," which is a continuation of U.S. patent application Ser. No. 12/580,905 filed Oct. 16, 2009, now U.S. Pat. No. 8,015,100, entitled "Method, Apparatus and Interface for Trading Multiple Tradeable Objects," which is a continuation of U.S. patent application Ser. No. 11/418,475, now U.S. Pat. No. 7,627,519, filed May 3, 2006, entitled "Method, Apparatus and Interface for Trading Multiple Tradeable Objects," which is a continuation of U.S. patent application Ser. No. 10/293,585, now U.S. Pat. No. 7,418,422, filed Nov. 13, 2002, entitled "Method, Apparatus and Interface for Trading Multiple Tradeable Objects," the contents of all of which are fully incorporated by reference herein.

This application is also related to U.S. patent application Ser. No. 11/417,886, now U.S. Pat. No. 7,512,561, filed May 3, 2006, entitled "Method, Apparatus and Interface for Trading Multiple Tradeable Objects," U.S. patent application Ser. No. 12/474,864, now U.S. Pat. No. 8,332,304, filed May 29, 2009, entitled "Trading Interface for Facilitating of Multiple Tradeable Objects in an Electronic Trading Environment," U.S. patent application Ser. No. 10/954,681, now U.S. Pat. No. 7,571,134, filed Sep. 30, 2004, entitled "Trading Interface for Facilitating Trading of Multiple Tradeable Objects in an Electronic Trading Environment," U.S. patent application Ser. No. 12/349,015, filed Jan. 6, 2009, now U.S. Pat. No. 7,774,267, entitled "System and Method for Facilitating Trading of Multiple Tradeable Objects in an Electronic Trading Environment," and U.S. patent application Ser. No. 10/954,682, now U.S. Pat. No. 7,523,064, filed Sep. 30, 2004, entitled "System and Method for Facilitating Trading of Multiple Tradeable Objects in an Electronic Trading Environment," U.S. patent application Ser. No. 12/825,677, filed Jun. 29, 2010, entitled "System and Method for Facilitating Trading of Multiple Tradeable Objects in an Electronic Trading Environment," and U.S. patent application Ser. No. 13/659,055, filed Oct. 24, 2012, entitled "Trading Interface for Facilitating Trading of Multiple Tradeable Objects in an Electronic Trading Environment," the contents of each of which are fully incorporated by reference herein.

FIELD OF THE INVENTION

The present invention relates generally to the electronic trading. More specifically, it relates to a method, apparatus and interface for trading multiple tradeable objects.

BACKGROUND

Trading methods have evolved from a manually intensive process to a technology enabled, electronic platform. Advances in technology are having an increasingly large and broad impact on trading and the way in which exchanges conduct business. What was previously seen as just a supplement to the traditional pit trading, electronic trading platforms continue to increase in importance and popularity. The advent of electronic trading has meant that a customer can be in virtually direct contact with the market, from practically anywhere in the world, performing near real-time transactions, and without the need to make personal contact with a broker. Electronic trading systems are also convenient for floor brokers on the floor at an exchange for receiving orders electronically.

Many exchanges throughout the world now support electronic trading systems. Electronic trading has made it easier for a larger number of people with many different trading strategies to participate in the market at any given time. The increase in the number of potential traders has led to, among other things, a more competitive market, greater liquidity, and rapidly changing prices. In the electronic trading environment, speed is of great importance with respect to both the receipt of market data from the exchanges and the delivery of transactions to the exchanges. The risk of loss can be substantially increased if information flowing in either direction is out of date.

Exchanges that implement electronic trading are generally based on one or more centralized computers (host), one or more networks, and the exchange participants' computers (client). In general, the host forms the electronic heart of the fully computerized electronic trading system. The host's operations typically cover order-matching, maintaining order books and positions, price information, and managing and updating the database for the online trading day as well as nightly batch runs. The host is also typically equipped with external interfaces that maintain online contact to quote vendors and/or other price information systems.

Typically, traders can link to the host via a client through one or more networks, where a network may include a direct data line between the host and the client, or where a network may include other common network components such as high-speed servers, routers, and gateways, and so on. For example, a high-speed data line may be used to establish direct connections between the client and the host. In another example, the Internet may be used to establish a connection between the client and the host. There are many different types of networks known in the art that may link a trader to the host.

Regardless of the way in which a connection is established, a client device allows a trader to participate in the market. The clients typically use a software trading application to produce interactive trading screens. The trading screens enable the traders to enter and execute orders, obtain market quotes, and monitor positions while implementing various trading strategies including those previously used on the floor of an exchange. Such strategies incorporated into an electronic marketplace can improve the speed, accuracy, and ultimately the profitability of trading electronically.

For certain trading strategies, traders may be interested in monitoring and participating in markets for two or more tradeable objects. Known trading applications have limited capabilities to address this interest. For example, market information for one tradeable object may be displayed in a trading interface in a first trading window and information on a second tradeable object may be displayed in a second trading window. Another available alternative provides limited market information about a first tradeable object in one row of a table and market information about a second tradeable object in a different row of the table. A disadvantage of these known trading applications is that the trader who is interested in both tradeable objects must take the time to try to discern the current relationships between the tradeable objects. Order entry is also complicated by the multiple windows and/or multiple rows of market information.

It would therefore be desirable to have an improved apparatus, method and interface for trading multiple tradeable objects.

BRIEF DESCRIPTION OF THE FIGURES

The presently preferred embodiments are described herein with reference to the drawings, in which:

FIG. 2 shows a graphical user interface for trading multiple tradeable objects in accordance with a preferred embodiment;

FIG. 3 is an alternative embodiment of the graphical user interface of FIG. 2 in which market information is consolidated;

DETAILED DESCRIPTION

1. General Overview of an Electronic Network

Figure 1:
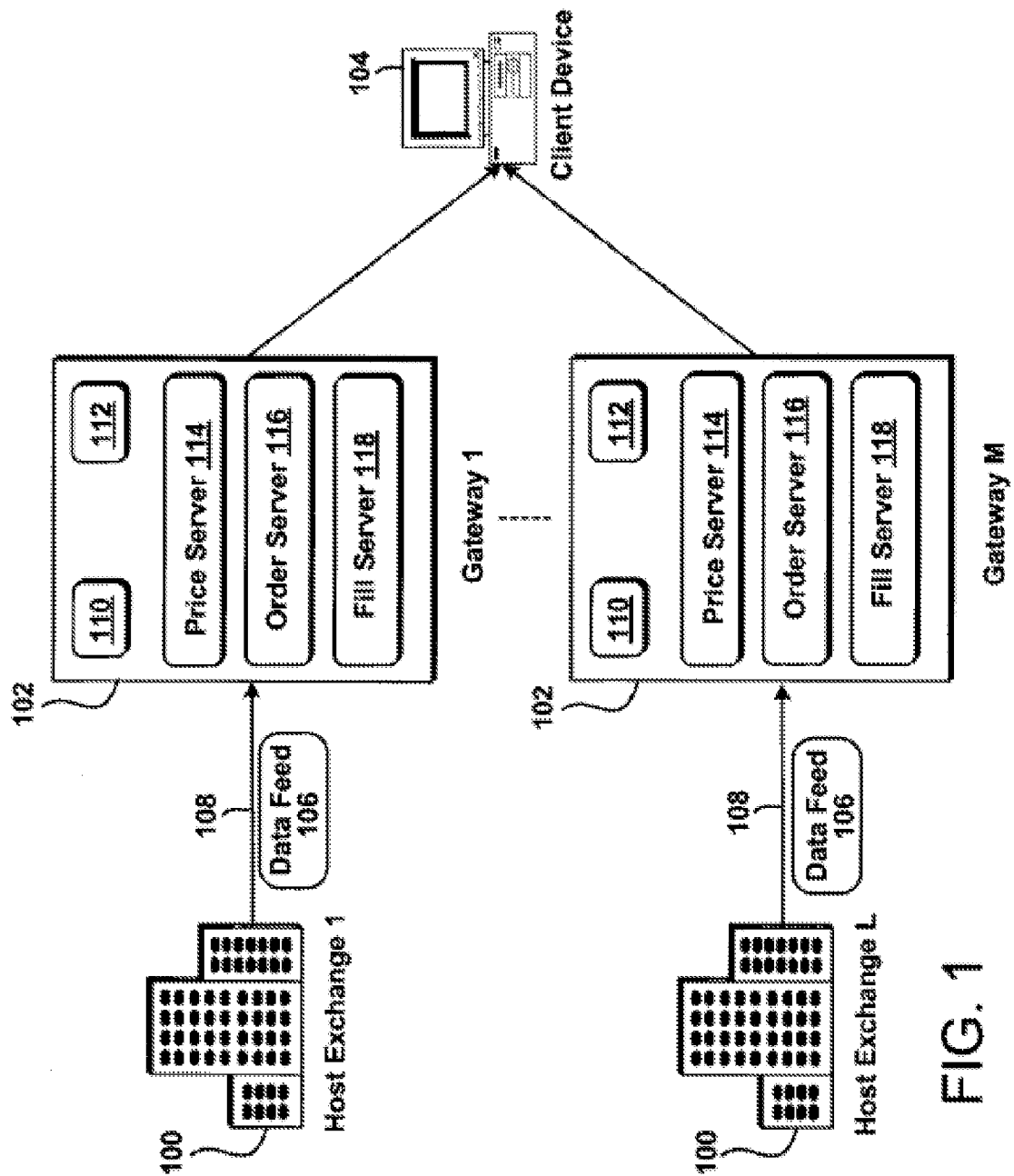
FIG. 1 shows a system diagram of network devices receiving data from exchanges and relaying the data to a client device.

FIG. 1 shows an example host exchange, gateway, and client device that implements the trading of multiple tradeable objects in accordance with a preferred embodiment. In a preferred embodiment, the system generally includes a host exchange 100, a gateway 102, and a client device 104. Preferably, the system can support up to X host exchanges, Y gateways 102, and Z client devices (although X host exchanges, Y gateways, and Z client devices are not shown for sake of clarity), where X, Y, and Z represent any number. In an illustrative embodiment, X and Y may be the same number such that there is a one-to-one correspondence between host exchanges 100 and gateways 102, but such numerical correspondence is not required.

Examples of host exchanges 100 include an Electronic Communication Network (ECN) like Island, which is a well-known electronic trading facility. Another host exchange 100 might be, for example, the Chicago Mercantile Exchange (CME), the Xetra (a German stock exchange), or the European derivatives market (Eurex). The preferred embodiments are not limited, however, to any particular exchange, and it should be understood that any entity that provides electronic market information, accepts electronic orders, and/or provides order status information may function as the host exchange. As known in the art, the gateway 102 is one or more computers (or program(s)) running software that receives information from the host exchange in the form of price information, order information, and fill information. Also known in the art, the client device 104 is a computer or equivalent device that receives one or more data feeds from the gateway 102. The host exchanges 100, gateways 102, and client device 104 are explained below in their respective sections.

It should be understood that the preferred embodiments are not limited to any particular network architecture, but rather may be applied with utility on any electronic device in any network that can be used for electronic trading. Furthermore, the preferred embodiments are not limited to a completely electronic trading environment where orders are sent to an electronic matching engine. For example, the invention could be utilized with an electronic trading application that sends orders electronically to a terminal where a person (e.g., a floor broker) executes those orders in a traditional open outcry trading floor.

Host Exchange

Each different host exchange 100 typically provides different types of information, and relays this information, or some portion thereof, collectively referred to as a data feed, over a network to market participants or traders. A data feed from one exchange may contain different information, e.g. representing different tradeable objects, than another data feed from a second exchange. Different host exchanges may also provide different amounts of information, e.g. market depth away from the inside market, and may provide information in different formats. However, it is not necessary in the preferred embodiments that the data feeds from exchanges either include the same data or different data.

As used herein, the term "tradeable objects" refers simply to anything that can be traded with a quantity and/or price. It includes, but is not limited to, all types of tradeable objects such as financial tradeable objects, which can include, for example, stocks, options, bonds, futures, currency, and warrants, as well as funds, derivatives and collections of the foregoing, and all types of commodities, such as grains, energy, and metals. The tradeable object may be "real," such as products that are listed by an exchange for trading, or "synthetic," such as a combination of real products that is created by the user.

In general, a data feed 106 may include information representing prices and quantities for a tradeable object. For example, the data feed 106 could include data relating to the "inside market" and/or data relating to "market depth." The inside market is the highest bid price and the lowest ask price available in the market. Data feeds 106 from some exchanges also include data corresponding to quantities available at the inside market prices and at other prices—this may be called the market depth. Market depth may be represented by the available order book, including all the current bid and ask quantities and their associated prices, or any portion thereof. In other words, market depth is at least a portion of the available pending bid and ask quantities entered at a particular price. The data feed 106 can contain other types of market information, such as the last traded price (LTP), the last traded quantity (LTQ), total traded quantity (TTQ), order information, and/or fill information. The information in a data feed 106, whether it contains the inside market and/or market depth or more market information, is generally categorized into three groups referred to as price, order, and fill information.

In one embodiment, each host exchange 100 sends a data feed 106 to a gateway 102. The data feed 106 preferably carries all of the information that the exchange 100 provides, such as price, order, and fill information, and alternatively may include more information. The host exchange 100 may send its data feed 106 to the gateway 102 over a dedicated line 108, which is a communication channel that permanently connects the exchange to the gateway. Dedicated lines may be private or leased lines such as T1 lines, which are known by those skilled in the art. Or alternatively, the host may send its data feed to the gateway over a switched network such as a wide area network (WAN), Internet, PSTN, legacy networks that utilize X.25 protocol or also IBM LU6.2 SNA protocol, satellite broadcast systems that use leased satellite channels to broadcast price data, or a packet switched network, such as ATM or Frame relay, which are connection methods known by those skilled in the art. As noted above, the preferred embodiments are not limited to any particular network architecture. The foregoing examples are provided merely to illustrate the wide variety of networks to which the preferred embodiments may be applied.

According to the embodiment of FIG. 1, if there were five exchanges, then each exchange would have a gateway, and then according to this example there would be five gateways (i.e., X=Y). When a trader wants to participate in the market at two of the five exchanges, he or she may subscribe only to the data feeds that correspond to those two exchanges. If the trader decides to drop one of the exchanges or add another exchange, he or she may preferably do so at any time.

In another embodiment, each host exchange sends a data feed to a single gateway. For example, if there were five exchanges, then each exchange would send its data to the single gateway. Then, when a trader wants to participate at two of the five exchanges, he or she can simply subscribe to the data feeds that correspond to those two exchanges at the gateway. Also, if the trader decides to drop one of the exchanges or add another exchange, he or she may do so at any time. Of course, a hybrid system, in which multiple exchanges share a single gateway while other exchanges utilize distinct gateways, may alternatively be used.

In yet another embodiment, some exchanges may have multiple gateways, so that if there were five exchanges, then there might be three gateways supporting each of them; for fifteen gateways. This embodiment allows for a load balancing, among other benefits, of the gateways' workstations.

The preferred embodiments are not limited to any particular mathematical relationship between the number of host exchanges and the number of gateways. Those skilled in the art will appreciate that any of the foregoing examples, as well as combinations of these examples or entirely different architectures, may alternatively be used.

Gateway

As mentioned earlier, the gateway 102 is a computer (or program) that receives information from the host exchange. As used herein, a computer includes any device with memory and a processor capable of processing information to produce a desired result. Thus, a gateway can be a computer of any size such as a server, workstation, personal computer, or laptop, but generally, the gateway is any computer device that has the processing capability to perform the function described herein. Moreover, it should be understood that the functions of the gateway could be moved to the exchange and/or the client device to reduce or eliminate the need for a gateway.

In one embodiment, the gateway 102 receives a data feed 106 from an exchange 100. Preferably, the gateway 102 receives the data feed 106 and converts it to a form compatible with the protocols used by the client device 104 using conversion techniques known in the art. As known by those skilled in the art, the gateway 102 may have one or more servers to support the data feeds, such as a price server 114 for processing price information, an order server 116 for processing order information, and a fill server 118 for processing fill information. Generally, a server is a computer or program that responds to commands from a client in the form of subscriptions. The "servers" here may run on the same machine or may run on independent machines. A trader at a client device can subscribe to price information, order information, and fill information for that exchange. Once a client device has subscribed to the information, the gateway 102 publishes the information to the client device 104.

Client Device

As mentioned before, the client device 104 may be a computer or equivalent device, such as a workstation, that allows a trader to participate in the market hosted at the exchange. The client device 104 is not limited to any particular hardware and/or software, but rather may be any device that is capable of communicating with an exchange 100. For example, the client device 104 may be a personal computer, terminal, workstation, personal digital assistant ("PDA"), smart phone, or any other wired or wireless communication device.

In general, the client device uses software that creates specialized interactive trading screens on a terminal associated with the client device. The trading screens enable traders to enter and execute orders, obtain market quotes, and monitor positions. The range and quality of features available to the trader on his or her screens varies according to the specific software application being run. In addition to or in place of the interactive trading screens, the client device may run automated non-interactive types of trading applications.

A commercially available trading application that allows a user to trade in a system like that shown in FIG. 1 is X_TRADER® from Trading Technologies International, Inc. of Chicago, Ill. X_TRADER® also provides an electronic trading interface, referred to as MD Trader™, in which working orders and/or bid and ask quantities are displayed in association with a static price axis. The preferred embodiments, however, are not limited to any particular trading application that performs the translation, storage and/or display functions. Portions of the X_TRADER° and the MD Trader™-style display are described in U.S. Pat. No. 6,772,132, entitled "Click Based Trading With Intuitive Grid Display of Market Depth," and U.S. Pat. No. 6,938,011, entitled "Click Based Trading With Market Depth Display," the contents of both of which are incorporated by reference herein. Moreover, the trading application may implement tools for trading tradeable objects that are described in U.S. Pat. No. 7,389,268, entitled "Trading Tools for Electronic Trading," the contents of which are incorporated by reference.

2. Trading Multiple Tradeable Objects

Using an electronic network like that described above, any client device 104 is capable of receiving data feeds relating to multiple tradeable objects from one or more host exchanges 100, so that a trader may participate in more than one market. For example, using the MD Trader™-style display of the X_TRADER® trading application, a trader may open a separate MD Trader™-style display window for each tradeable object in which the trader is interested, subject to the number of windows that can be displayed on the display screen(s) or monitor(s) of the trader's client device 104. In accordance with a preferred embodiment, however, a single trading window for multiple tradeable objects is provided, allowing the trader to visualize the relationships among the multiple tradeable objects while participating in their corresponding markets.

Trading two or more tradeable objects may be of interest to traders who, for example, are trading spreads, seeking arbitrage opportunities, or executing other trading strategies. In addition, some traders attempt to simultaneously trade two or more tradeable objects that are identical, other than being offered at different exchanges, or related, such that there is a natural relationship in their price movements. In accordance with a preferred embodiment, therefore, a multiple tradeable object graphical user interface is provided to assimilate two or more presentations of market information and/or order entry into one screen for trading the multiple tradeable objects.

Multiple Tradeable Object Graphical User Interface

FIG. 2 shows a graphical user interface 200 for trading multiple tradeable objects in accordance with a preferred embodiment. The graphical user interface 200 includes a price axis 202, which, in this example, is presented as a vertical column. Other orientations may alternatively be used, such as horizontal or at an angle to create a three-dimensional effect for example. The price axis 202 (which can be displayed or not displayed) may be referred to herein as being "static," which means that information relating to the tradeable objects, such as bid and ask quantities or working orders are displayed dynamically relative to the price axis so that the indicators associated with the inside market can move along the price axis when the market changes. It should be understood that, in this context, static does not mean immovable on the display, but rather means fixed in relation. For example, the static price axis 202 may be moved or repositioned on the display as a result of a command from a user (such as a recentering or repositioning command), but the prices on the axis remain fixed in relation to each other, subject to consolidation or expansion as described below.

The prices may be arranged along the price axis 202 in predetermined steps or increments. The smallest increment on the price axis 202 is generally the "tick size," which may depend on the particular tradeable object and is typically set by the host exchange as the smallest increment on which the tradeable object may trade. Although the axis described herein is a "price" axis, those skilled in the art will recognize that the axis may alternatively be a scale of any characteristic that is capable of representing value for the tradeable objects. For example, the axis may represent yield or volatility rather than price.

In the embodiment shown in FIG. 2, the graphical user interface 200 supports the trading of two tradeable objects. A first tradeable object indicator 204 displays an indicator that represents the first tradeable object, and a second tradeable object indicator 206 displays an indicator that represents the second tradeable object. The indicators may be the registered trading (or ticker) symbols associated with the tradeable objects, but, in an alternative preferred embodiment, the indicator may be determined by the trader or an administrator (such as where multiple client devices are used by an entity). As a further alternative, the trading application may associate indicators with tradeable objects. An example indicator is color. In cases where the same product is traded at more than one host exchange, each product/host exchange combination may be treated as a different tradeable object with a unique indicator. An advantage of this tradeable object definition is explained below with reference to an illustrative application for the interface. In yet another alternative embodiment, the graphical user interface 200 may be modified to accommodate more than two tradeable objects, as described below.

For each tradeable object, the graphical user interface 200 preferably presents at least a portion of the order book information distributed by the host exchange. Thus, the graphical user interface 200 includes a first tradeable object bid quantity region 208 and a first tradeable object ask quantity region 210. The graphical user interface 200 also includes a second tradeable object bid quantity region 214 and a second tradeable object ask quantity region 216. The regions 208, 210, 214 and 216 collectively illustrate at least a portion of the market depth for the tradeable objects of interest, in this example by displaying pending order quantities in association with the price axis 202. Alternatively, the graphical user interface 200 could just display indicators associated with the inside market price levels of the tradeable objects.

For the embodiment shown in FIG. 2, the regions 208, 210, 214 and 216 are vertical columns arranged in nested pairs about the price axis 202, with bid quantities being displayed on one side of the price axis 202 and ask quantities being displayed on the other side of the price axis 202. The price axis 202 is also illustrated as a vertical column. Of course, the regions 208, 210, 214 and 216 and the price axis 202 may alternatively be arranged as rows or in any other manner to illustrate the relationship between market depth and a price axis. In addition, although the nested pair arrangement of the market depth for multiple tradeable objects is preferred, an alternative embodiment allows the user to arrange the regions 208, 210, 214 and 216 in any desired order in relation to the price axis 202. In this embodiment, the regions 208, 210, 214 and 216 allow for the dynamic display of bid and ask quantities relative to the static price axis 202.

The preferred embodiments are not limited to any particular arrangement of prices and quantities and, in particular, are not limited to two-dimensional grid displays. Three-dimensional grid displays, and two-dimensional and three-dimensional graphical displays may alternatively be used. Nor are the preferred embodiments limited to any particular format for displaying prices and/or quantities. For example, it is not necessary that the prices and/or quantities be displayed numerically. Rather, graphical representations may alternatively be used. It is also not necessary that the market information be displayed relative to a static price axis.

In order to distinguish markets represented by the quantity regions 208, 210, 214 and 216, the regions may be color coded. For example, the regions 208 and 210 may be displayed in a first color or shades of the first color, and, likewise, the regions 214 and 216 may be displayed in a second color or shades of a second color. Color may also be used to provide additional information to the trader about the markets for the multiple tradeable objects. For example, color gradients may be used to illustrate which market has greater depth, shorter queues, or the lowest latency. Other uses for color, which may be applied to the preferred embodiments, are described in U.S. Pat. No. 7,389,268.

In order to facilitate the display of multiple tradeable objects, and in particular the market depth of multiple tradeable objects in relation to a common price axis, the graphical user interface 200 may include a first tradeable object offset indicator 220 and a second tradeable object offset indicator 222. The offsets 220 and 222 are provided to skew, by the selected number of ticks or cells, the quantities displayed for the respective tradeable object relative to the price axis 202.

Preferably, the offsets 220 and 222 may be set, selected and/or adjusted by the user. As will be recognized by those skilled in the art, the particular form of the offset is dependent upon the relationship between the tradeable objects that are being displayed. As a result, the offset may take whatever form is necessary to display the multiple tradeable objects in relation to a common, normalized scale. For example, the offset may be a multiplier or divisor, an equation, or a fixed number that may be added to or subtracted from the disseminated price of a tradeable object. The equation may include factors, based on data available to the client device 104, in addition to the disseminated price. For example, the equation may perform a rounding function for the case in which the multiple tradeable objects trade with different tick sizes. Alternatively, the user may choose an equation based on his or her perception of a mathematical relationship among the tradeable objects. The use of offsets therefore provides a great deal of flexibility in normalizing tradeable objects in relation to a common axis.

It should be noted, however, that the use of offsets is optional and not necessary for the preferred embodiments. For example, offsets are not required in cases where the multiple tradeable objects are the same underlying product at different host exchanges. In addition, although separate offsets 220 and 222 are described, a single offset representing the relative adjustment between the tradeable objects may alternatively be used.

U.S. Pat. No. 6,772,132, entitled "Click Based Trading With Intuitive Grid Display of Market Depth," and U.S. Pat.

No. 6,938,011, entitled "Click Based Trading With Market Depth Display," the contents of both of which are incorporated by reference herein, describe interfaces that not only display market information in relation to a price axis, but also allow a user to enter and track orders. A preferred embodiment of the present invention extends this order entry and tracking capability to multiple tradeable objects using a single trading window.

As shown in FIG. 2, the graphical user interface 200 includes a first tradeable object working quantity region 212 and a second tradeable object working quantity region 218. Again, while both are illustrated as columns, it will be appreciated that, like those described above, the regions 212 and 218 may alternatively be presented in rows or in any other manner to illustrate the relationship between the working orders and a price axis. It should be noted that it is not necessary that there be a separate working quantity region for each tradeable object. For example, a single working quantity region column may be used as an alternative, where the working orders for the different tradeable objects are distinguished, such as by the use of color, graphics, or additional text. Nor is it necessary that the graphical user interface 200 include order entry or tracking capabilities.

For the embodiment of FIG. 2, indicators associated with working orders for the first tradeable object preferably may be displayed in the first tradeable object working quantity region 212 at a location that corresponds to the price on the price axis 202 at which the order is pending. Likewise, indicators associated with working orders for the second tradeable object may be displayed in the second tradeable object working quantity region 218. Preferably, a working order indicator displayed in the regions 212 and 218 includes information regarding partial fills of working orders. In other words, the working order regions 212 and 218 may display indicators that include an indication of the quantity in each working order that has been filled, as well as the quantity that remains to be filled. When a working order is completely filled, the indicator associated with that working order is preferably no longer displayed in the working order region 212, 218.

In one embodiment, order parameters may be set directly from the graphical user interface 200. Each tradeable object represented in the multiple tradeable object graphical user interface 200 preferably has an order configuration area 230. In the embodiment shown, a distinct order configuration area 230 is provided for each tradeable object. A single order configuration area 230 for multiple tradeable objects may alternatively be used. The location of the order configuration area 230 with respect to the graphical user interface 200 is not critical; it may appear in any convenient location.

As illustrated in FIG. 2, the order configuration area 230 of the graphical user interface 200 preferably includes an order quantity keypad 232, which the trader may use to select the quantity associated with subsequent orders, such as by clicking with a mouse or other pointer on the appropriate number in the order quantity keypad 232. The order configuration area 230 may alternatively or in addition include cells for other order parameters, like conditions for execution (e.g., all or none, time in effect, etc.). It may also include a market order button to automatically submit a market order for a selected quantity of the tradeable object and delete buttons that if depressed cause all buy or sell orders to be deleted. The order configuration area 230 may also include a delete all button that if depressed causes all orders to be deleted. Those skilled in the art will appreciate that additional order parameters may be readily incorporated into the order configuration area 230.

Preferably, the trader may also set order parameters using a drop down menu or order parameter dialog window. In accordance with one embodiment, order parameters that are set in this manner remain in effect until changed by using either the order configuration area 230 or the drop down menu/dialog window. The preferred embodiments are not limited, however, to embodiments in which the trader may set order parameters.

As described in U.S. Pat. No. 6,772,132 and U.S. Pat. No. 7,127,424, limit orders may be submitted by clicking, using a mouse or other pointing device, within a region of the display at the level of the desired price on the price axis. Preferably, the graphical user interface 200 operates in a like manner. Specifically, a trader may submit a limit order by clicking within the appropriate bid/ask quantity regions 208, 210, 214 and 216 in the cell or area associated with the desired price on the price axis 202. The quantity associated with the limit order may be set in advance using either the order quantity keypad 232 or a drop down menu or dialog window. Again, however, the preferred embodiments are not limited to embodiments in which mouse clicks are utilized for order submission. In fact, the preferred embodiments may, in one alternative, merely display market information without providing any manner for submitting orders. In addition, the invention is not limited to embodiments in which the user must click within the bid/ask quantity regions, but can provide for other regions or areas of the display in which the user can click to submit orders.

Returning to FIG. 2, the graphical user interface 200 optionally provides the trader with an indication of the trader's current position. In particular, the graphical user interface 200 includes a first tradeable object position indicator 224, a second tradeable object position indicator 226 and a net position indicator 228. The first tradeable object position indicator 224 indicates the quantity of the first tradeable object (in this example "CBT") that the trader has bought or sold, and the second tradeable object position indicator 226 provides the same information for the second tradeable object (in this case "BT"). In the example of FIG. 2, the trader is long 100 CBT and short 227 BT, for a net short 127 position. Preferably, the trader may define a relationship among the tradeable object position indicators for determining the net position.

Although described with reference to a graphical user interface for trading two tradeable objects, the graphical user interface 200 may be extended to trade more than two tradeable objects, for example by adding, for each additional tradeable object, a corresponding bid quantity region, ask quantity region, working quantity region, an order configuration area, and a tradeable object position indicator. Of course, if the interface is not to be used for order entry, then the working quantity region and the order configuration area need not be displayed. Depending on the tradeable object, a tradeable object offset may also need to be defined.

In an alternative embodiment, market information regarding multiple tradeable objects may be consolidated for display. Price consolidation is described in U.S. Pat. No. 7,127,424, entitled, "Click Based trading With Intuitive Grid Display of Market Depth And Price Consolidation," the contents of which is incorporated herein by reference. In cases where price is represented along a vertical axis, price consolidation may be thought of in terms of the vertical consolidation of the axis, where multiple price levels are condensed into a single price level.

In accordance with this alternative embodiment, consolidation may be applied to other market information, such as quantities associated with two or more of the multiple tradeable objects. In this case, however, the consolidation takes effect across quantity cells. For example, two or more of the quantity regions, such as the regions 208, 210, 214 and 216 in FIG. 2 may be combined. Specifically, if two tradeable objects are being traded and the bid quantities are displayed in columns, the two bid quantity columns may be consolidated into a single bid quantity column. This approach is particularly advantageous in cases where the multiple tradeable objects are actually the same underlying products but they are being traded at different host exchanges.

It is to be understood that this alternative embodiment including consolidated market information is not limited to use in a graphical user interface that includes a static axis representing price or value. To the contrary, it may be implemented in a wide variety of graphical user interfaces, which may either include or not include a static axis representing price or value.

FIG. 3 is an alternative embodiment of the graphical user interface of FIG. 2 in which market information, in this case the bid and ask quantities, is consolidated. In the user interface 300 of FIG. 3, the bid quantity region 208 and the bid quantity region 214 from FIG. 2 are combined into a consolidated bid quantity region 302. In the illustrated example, the combined bid quantity region 302 is a vertical column that is displayed in association with a price axis 304, although as noted above the display of the price axis 304 is optional. Similarly, the ask quantity regions 210 and 216 from FIG. 2 are combined into a consolidated ask quantity region 306.

Preferably, the user has the option of viewing the market information in consolidated form, as illustrated in FIG. 3, or as distinct markets, as illustrated in FIG. 2. In other words, one variation of this alternative embodiment is a graphical user interface that is capable of switching between the form shown in FIG. 2 and the form shown in FIG. 3 based on a user input.

In the consolidated market information display of FIG. 3, as well as the user interface shown in FIG. 2, color may be used to provide additional information to the user. For example, in the consolidated display, quantities that represent combined markets from two or more host exchanges may be presented in a first color, whereas quantities that are available at only one of the host exchanges may be presented in a different color. In accordance with a preferred alternative, an indicator is activated when the markets for the tradeable objects cross. For example, color, highlighting or a different font may be used to indicate that the markets are crossed at a particular price level, thereby drawing the trader's attention to that particular market information. This technique may be used with a graphical user interface of the type shown in FIG. 2 as well as with the consolidated user interface of FIG. 3.

Figure 4:
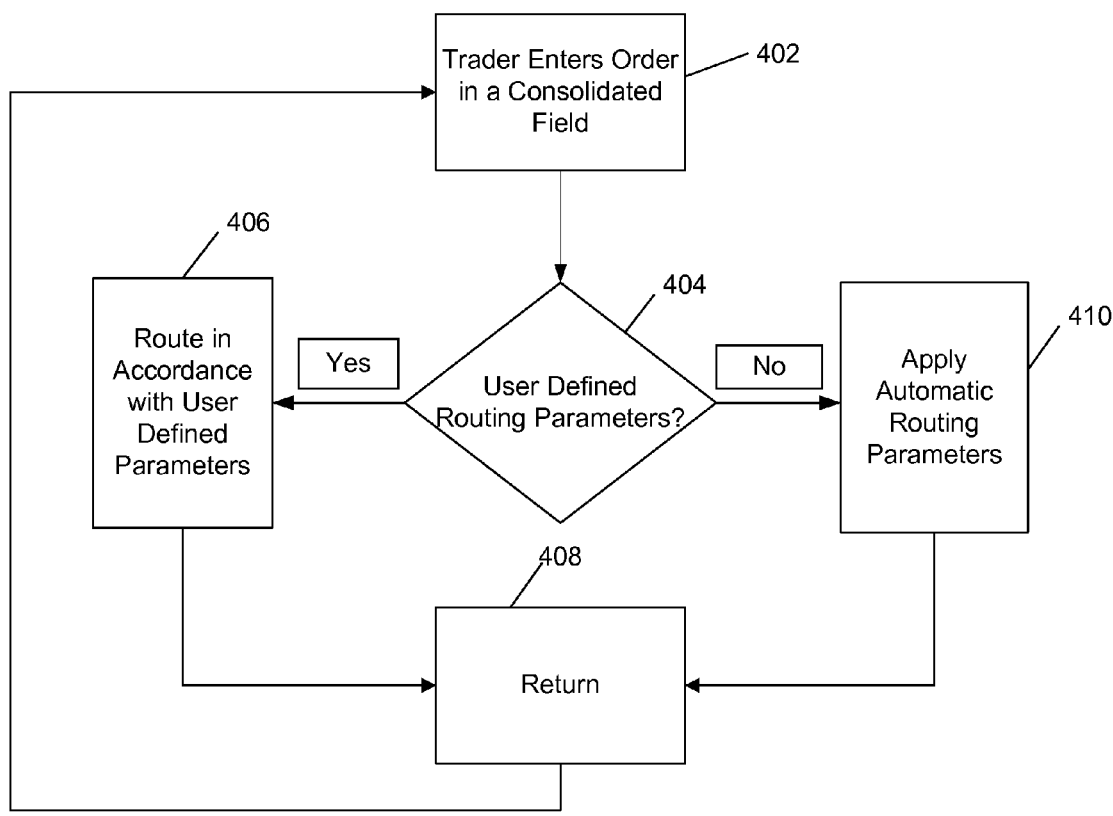
FIG. 4 is a flowchart of a process to route orders entered using the graphical user interface of FIG. 3.

For the embodiment shown in FIG. 3, the interface 300 supports order submission. It should be understood, however, that the preferred embodiments are not limited to interfaces that support order submission, but rather encompass interfaces that merely display market information. When the market information is consolidated, as illustrated in FIG. 3, the trading application supporting the client device preferably handles the routing of orders entered in a consolidated field, such as a consolidated bid quantity field or a consolidated ask quantity field. Orders may be entered using a mouse or other pointing device, as described above, or in any other manner. FIG. 4 is a flowchart of a process 400 to route orders entered using the graphical user interface of FIG. 3.

Preferably, the user may designate a preference to send orders to a favored market. For example, the user may prioritize or rank, using a drop down menu or dialog window, the host exchanges at which the tradeable objects associated with the consolidated market information are traded. Many factors may influence a user's routing preference. For example, routing decisions may be made based on the exchanges' clearing and/or transaction costs or margin requirements. Other factors may include the length of the order queue at the desired price, the age of the most recent price and/or quantity update, or the time required for a user's order to reach the host exchanges (also referred to as network latency or connection speed). Of course, other factors may alternatively be used to make routing decisions.

Orders may then be routed based on the ranking. Alternatively, the trader may define ratios for the host exchanges, and orders route in accordance with the defined ratio applied to the total order quantity. As a further alternative, the trading application may route the orders automatically, such as by randomly selecting a host exchange, routing the order to the host exchange that sent the most recent update, routing the order to the exchange with the lowest transaction costs, or selecting the host exchange with the shortest order queue at the order price or the lowest network latency. These automatic routing parameters are preferably selectable by the trader, such as through a drop down menu or a dialog window.

In another alternative, the trader may indicate routing instructions through an input device on an order-by-order basis. For example, where the input device is a mouse, the right click may be assigned to route orders to a first host exchange and the left click may be assigned to route orders to a second host exchange. In yet another alternative, routing preferences may be incorporated directly into the user interface. For example, an offset, such as the offsets 220 and 222 shown in FIG. 2, may incorporate clearing and/or transaction costs of the corresponding host exchange. It is to be understood, however, that the preferred embodiments are not limited to any particular manner of selecting or inputting routing parameters, and the routing techniques described herein are optional rather than required.

Returning to FIG. 4, the process 400 begins at step 402 when a trader enters an order in a consolidated field. Next, the process 400 determines, at step 404, whether a user, such as the trader or an administrator, has defined routing parameters. If the user has defined routing parameters, the process 400 proceeds to step 406, where the order is routed in accordance with the user-defined parameters. As noted in the preceding examples, the user or trader may rank the host exchanges such that orders entered in consolidated fields are routed to the highest ranking host exchange at which the tradeable object is traded. Alternatively, the user or trader may define a ratio for each host exchange at which the tradeable objects are traded, and the orders route in accordance with the defined ratio applied to the total order quantity. After the order is routed, the process 400 returns, at step 408, to a ready state for entry of the next order.

If, on the other hand, there are no user defined routing parameters, then the process 400 proceeds to step 410. At step 410, automatic routing parameters are applied to the order. As noted in the preceding examples, the automatic routing parameters may dictate that the order be routed by randomly selecting a host exchange, routing the order to the host exchange that sent the most recent update, selecting the host exchange with the shortest order queue at the order price, etc.

Illustrative Application for the Multiple Tradeable Object Graphical User Interface An illustrative application for the multiple tradeable object graphical user interface is set forth below. This illustration is not intended to be exhaustive, but rather to highlight some of the benefits and advantages associated with the preferred embodiments. One of the advantages of the multiple tradeable object graphical user interfaces described herein is that they provide, in a single window, a more accurate picture of the entire market for related tradeable objects. Applications in addition to those set forth below will no doubt become apparent to those skilled in the art upon reviewing this detailed description.

For certain trading strategies, a trader may want to trade the same tradeable object on two different exchanges. For example, a trader may want to simultaneously trade the 10Y Note future through the Chicago Board of Trade (CBOT) and the 10Y Note future through Brokertec. For this example, quantity consolidation, as described above, may also be beneficial because it provides the trader with a more complete picture of the entire market for this tradeable object.

As a numerical example, assume that tradeable object 1 and tradeable object 2 are the same tradeable object, but they are traded through different host exchanges. Because the different host exchanges provide markets for the same tradeable object, however, the prices of tradeable object 1 and tradeable object 2 are almost always the same. At a time, t, the markets provided by the two host exchanges are the same, both bid-ask 30-30.5. At a later time, t+1, the markets momentarily diverge: the first host exchange offers a market in tradeable object 1 at 29.5-30, while the second host exchange offers a market in tradeable object 2 at 30-30.5. The divergence will be readily obvious to the trader using the multiple tradeable object graphical user interface described above because the bid and ask quantities for tradeable object 1 and tradeable object 2 are displayed side-by-side.

In addition, the indicators representing quantities to buy or sell at the price 30 (in this example) may be highlighted on the display. The highlighting of the divergence of the markets for tradeable object 1 and tradeable object 2 may be useful information for a trader. Traders may use this information differently depending on their personal trading strategies. For example, if a trader is looking to fill one leg of a spread by buying a 10Y Note future, the trader can use the information from the multiple market display to find the best price. Another example is a situation where a trader is looking for arbitrage opportunities—the multiple market display readily illustrates when the markets diverge.

Other illustrative applications for the multiple tradeable object graphical user interface include trading fungible products, basis trading and/or tradeable objects which the trader believes have a certain relationship. Those skilled in the art will recognize, upon reading this detailed description, other applications as well. The multiple tradeable object graphical user interface embodiments described herein may be used to trade any group of tradeable objects in which a relationship among the objects can be defined.

Trading Using a Multiple Tradeable Object Graphical User Interface

Figure 5:
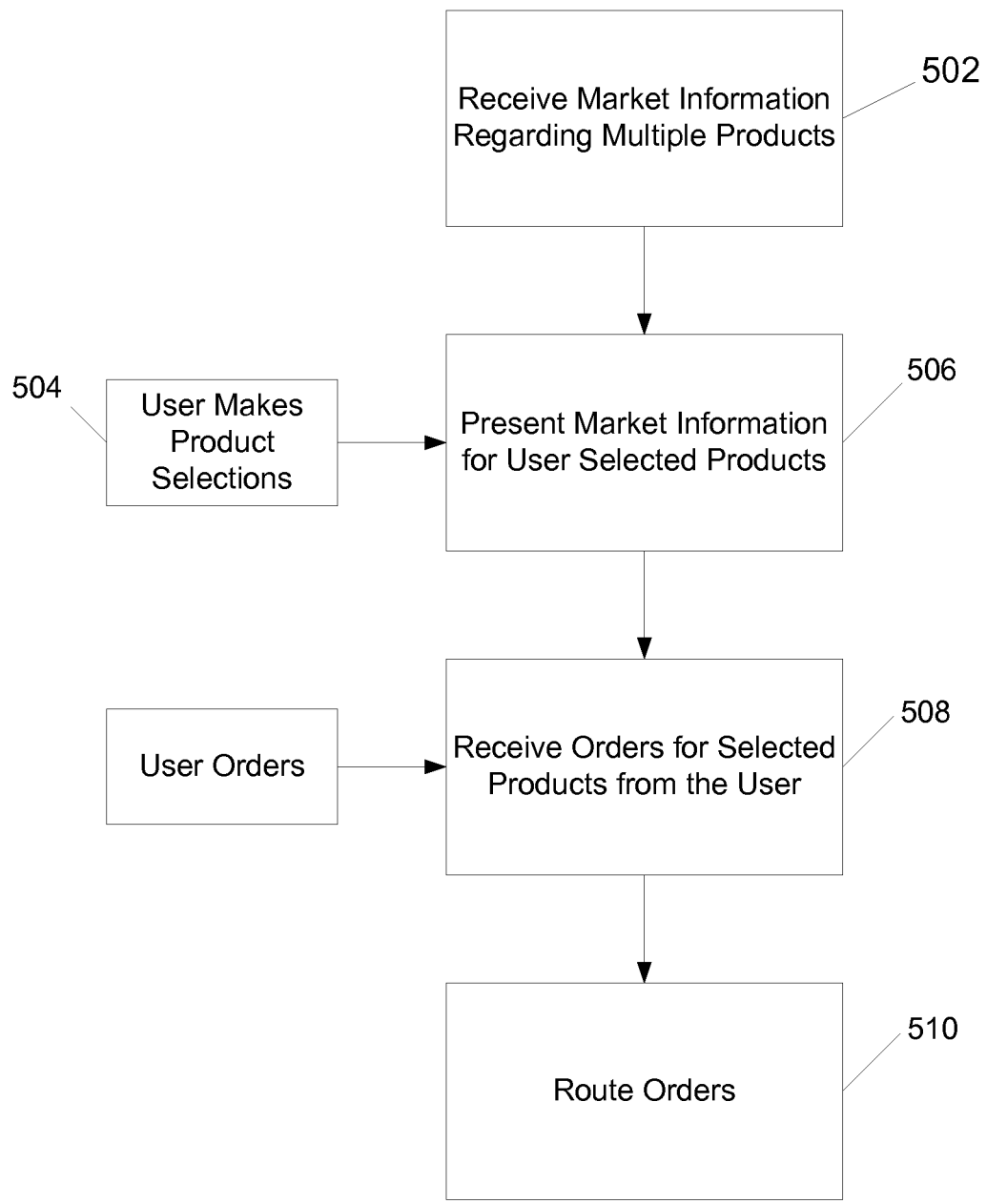
FIG. 5 is a flowchart of a preferred method for trading two or more tradeable objects using the graphical user interface of FIG. 2.

FIG. 5 is a flowchart of a preferred method 500 for trading two or more tradeable objects using the graphical user interface of FIG. 2. At step 502, market information regarding multiple tradeable objects is received. In accordance with the terminology used herein, a tradeable object that is traded at more than one host exchange may be considered multiple tradeable objects, where each individual tradeable object corresponds to the tradeable object as it is traded at a particular host exchange. The network architecture of FIG. 1, for example, may be used to obtain market information from one or more host exchanges. Of course, other network topologies may alternatively be used. The market information preferably includes market depth in addition to the inside market. It may also include a last traded price and quantity, and/or a total traded quantity.

At step 504, the method receives a tradeable object selection from the user. The tradeable object selection includes an identification of two or more tradeable objects that the user desires to trade. For the greatest advantage, the selected tradeable objects should be related, for example as described in the Examples set forth above.

The method proceeds to step 506, where market information for the user selected tradeable objects is presented to the user. In accordance with a preferred embodiment of the method, the market information is presented on a display to the user by associating the market information for the selected tradeable objects with a single static price axis. Preferably, the market information is presented on an interactive user interface. In one embodiment, the presentation of market information includes bid and ask quantities for each selected tradeable object that are dynamically displayed in association with the static price axis, as illustrated for example in FIG. 2. In another embodiment, the market information may be consolidated, as illustrated for example in FIG. 3. In addition to market information from the host exchanges, the user interface preferably displays working orders to the user and also provides order entry functionality.

Preferably, the method further includes, at step 508, receiving orders from the user regarding the selected tradeable objects. As described above, a user may place orders using the interface by clicking, using for example a mouse or other pointing device, in the quantity regions (or any region or area of the display designated for order entry) at the appropriate price level. At step 510, the user's orders are routed to one or more host exchanges. Where one or more of the market information fields are consolidated, orders may be routed automatically or in accordance with user preferences, as described above.

It should be understood that the programs, processes, methods and apparatus described herein are not related or limited to any particular type of computer or network apparatus (hardware or software), unless indicated otherwise. Various types of general purpose or specialized computer apparatus may be used with or perform operations in accordance with the teachings described herein. While various elements of the preferred embodiments have been described as being implemented in software, in other embodiments hardware or firmware implementations may alternatively be used, and vice-versa.

In view of the wide variety of embodiments to which the principles of the present invention can be applied, it should be understood that the illustrated embodiments are examples only, and should not be taken as limiting the scope of the present invention. For example, the steps of the flow diagrams may be taken in sequences other than those described, and more, fewer or other elements may be used in the block diagrams.

The claims should not be read as limited to the described order or elements unless stated to that effect. Thus, all variations that come within the scope and spirit of the following claims and equivalents thereto are claimed as the invention.

The invention claimed is:

1. A non-transitory computer readable medium having instructions stored thereon, which when executed cause a processor to execute acts comprising:

receiving a user-selection of an order entry location corresponding to at least one axially aligned price level of a plurality of displayed axially aligned price levels, where each level of the plurality of displayed axially aligned price levels represents a combined value to trade a first tradeable object and a second tradeable object, where an underlying product of the second tradeable object is different from an underlying product of the first tradeable object, and where each combined value of the plurality of displayed axially aligned price levels is derived from at least both market data for the first tradeable object and market data for the second tradeable object; and initiating submission of a trade order for any of the first tradeable object and the second tradeable object in response to receiving the user-selection of the order entry location, and where an order quantity of the trade order is allocated between the first tradeable object and the second tradeable object according to a quantity allocation rule.

2. The non-transitory computer readable medium of claim 1 where the quantity allocation rule comprises any of a user-defined rule, a ratio, and an exchange related parameter.

3. The non-transitory computer readable medium of claim 2 where the exchange related parameter comprises any of a length of an order queue at a price of the trade order at an electronic exchange, a time associated with submitting an order, transaction costs, and a time of a last update received from an electronic exchange.

4. The non-transitory computer readable medium of claim 1 where the quantity allocation rule comprises a quantity allocation rule that is based on a user-related parameter.

5. The non-transitory computer readable medium of claim 4 where the user-related parameter is based on a margin.

6. The non-transitory computer readable medium of claim 1 where the quantity allocation rule is selected based on time-of-day.

7. The non-transitory computer readable medium of claim 1 where the quantity allocation rule is selected based on a type of command received to send the trade order.

8. The non-transitory computer readable medium of claim 1 where the acts further comprise dynamically displaying a combined quantity indicator along the plurality of axially aligned price levels, where the combined quantity indicator represents any of a buy quantity for the first tradeable object and for the second tradeable object and an ask quantity for the first tradeable object and for the second tradeable object.

9. The non-transitory computer readable medium of claim 1 where a first click of a mouse corresponds to a command to send the trade order for the first tradeable object, and where a second click of the mouse corresponds to a command to send the trade order for the second tradeable object, the first click being different than the second click.

10. The non-transitory computer readable medium of claim 1 where the acts further comprise receiving the user-selection of the order entry location via a single action of a user input device.

11. The non-transitory computer readable medium of claim 10 where the single action consists of a single click of a mouse.

12. The non-transitory computer readable medium of claim 10 where the single action consists of a double-click of a mouse.

13. A method for submitting orders for a tradeable object, the method comprising:

receiving, via an input device associated with a processor, a user-selection of an order entry location corresponding to at least one axially aligned price level of a plurality of displayed axially aligned price levels, where each level of the plurality of displayed axially aligned price levels represents a combined value to trade a first tradeable object and a second tradeable object where an underlying product of the second tradeable object is different from an underlying product of the first tradeable object, and where each combined value of the plurality of displayed axially aligned price levels is derived from at least both market data for the first tradeable object and market data for the second tradeable object; and initiating submission, via the processor, of a trade order for any of the first tradeable object and the second tradeable object in response to receiving the user-selection of the order entry location, and where an order quantity of the trade order is allocated between the first tradeable object and the second tradeable object according to a quantity allocation rule.

14. The method of claim 13 where the quantity allocation rule comprises any of a user-defined rule, a ratio, and an exchange related parameter.

15. The method of claim 14 where the exchange related parameter comprises any of a length of an order queue at a price of the trade order at an electronic exchange, a time associated with submitting an order, transaction costs, and a time of a last update received from an electronic exchange.

16. The method of claim 13 where the quantity allocation rule comprises a quantity allocation rule that is based on a user-related parameter.

17. The method of claim 16 where the user-related parameter is based on a margin.

18. The method of claim 13 where the quantity allocation rule is selected based on time-of-day.

19. The method of claim 13 where the quantity allocation rule is selected based on a type of command received to send the trade order.

20. The method of claim 13 further comprising dynamically displaying a combined quantity indicator along the plurality of axially aligned price levels, where the combined quantity indicator represents any of a buy quantity for the first tradeable object and for the second tradeable object and an ask quantity for the first tradeable object and for the second tradeable object.

21. The method of claim 13 where a first click of a mouse corresponds to a command to send the trade order for the first tradeable object, and where a second click of the mouse corresponds to a command to send the trade order for the second tradeable object, the first click being different than the second click.

22. The method of claim 13 further comprising receiving the user-selection of the order entry location via a single action of a user input device.

23. The method of claim 22 where the single action consists of a single click of a mouse.

24. The method of claim 22 where the single action consists of a double-click of a mouse.

* * * * *